Aug. 8, 1967

M. B. WOOD 3,335,404

CONTINUOUS MONITOR AND BINARY CHAIN CODE TRANSMITTER AND RECEIVER SYSTEM

Filed July 5, 1963

6 Sheets-Sheet 1

Inventor
M. B. WOOD
By Cameron, Kerkam & Sutton
Attorneys

Inventor
M. B. WOOD
By Cameron, Kerkam & Sutton
Attorneys

Inventor
M. B. WOOD
By Cameron, Kerkam + Sutton
Attorneys

Aug. 8, 1967

M. B. WOOD

CONTINUOUS MONITOR AND BINARY CHAIN CODE TRANSMITTER AND RECEIVER SYSTEM 3,335,404

Filed July 5, 1963

6 Sheets-Sheet 4

Inventor
M. B. WOOD
By Cameron, Kerkam & Sutton
Attorneys

Inventor
M. B. WOOD
By Cameron, Kerkam & Sutton
Attorneys

Aug. 8, 1967

M. B. WOOD

CONTINUOUS MONITOR AND BINARY CHAIN CODE TRANSMITTER AND RECEIVER SYSTEM 3,335,404

Filed July 5, 1963

6 Sheets-Sheet 6

Inventor
M. B. WOOD

By Cameron, Kerkam & Sutton
Attorneys

1

3,335,404
CONTINUOUS MONITOR AND BINARY CHAIN CODE TRANSMITTER AND RECEIVER SYSTEM

Michael Broadley Wood, Sale, England, assignor to Ferranti, Limited, Hollinwood, England, a company of the United Kingdom of Great Britain and Northern Ireland Filed July 5, 1963, Ser. No. 293,109
Claims priority, application Great Britain, July 7, 1962, 26,145/62
21 Claims. (Cl. 340—164)

ABSTRACT OF THE DISCLOSURE

Indication of the occurrence of the event at a remote station is caused by a remote station transmitter including a binary digit chain code generator and means for modifying the binary digit chain code upon the occurrence of the event and a receiver located at a receiving station, the receiver including means for detecting modified binary digit chain codes and indicating means.

This invention relates to a method and apparatus for indicating the occurrence of one or more events at a remote station.

It is known to indicate the occurrence of an event at a remote station by arranging that the occurrence of the event causes a signal to be transmitted to a receiving station where the occurrence is indicated. When the event is only likely to occur at any time over a lengthy period, such as days or even weeks, it is desirable that the equipment at the remote station should be continuously monitored to ensure that it is functioning correctly.

It is an object of the present invention to provide a method of indicating the occurrence of one or more events at a remote station in which a signal is continuously transmitted from the remote station.

According to the present invention a method of indicating at a receiving station the occurrence of one or more events at a remote station comprises continuously generating a binary digit chain code at said remote station, causing the occurrence of a particular event to modify said chain code in a manner peculiar to that event, transmitting said chain code or said modified chain code to a receiving station, detecting modifications of said chain code at said receiving station and causing the resultant output when a modified chain code is detected to indicate the occurrence of said particular event.

Also in accordance with the present invention apparatus for indicating at a receiving station the occurrence of one or more events at a remote station comprises a binary digit chain code generator located at the remote station, means for causing the occurrence of a particular event to modify the output of said chain code generator in a manner peculiar to that event, means for transmitting the unmodified or the modified output of said chain code generator to said receiving station, detecting means located at said receiving station for detecting modified outputs of said chain code generator, and means for causing the output of said detecting means to indicate the occurrence of said particular event.

The present invention will now be described by way of example with reference to the accompanying drawings in which:

2

Figures 2, 3:
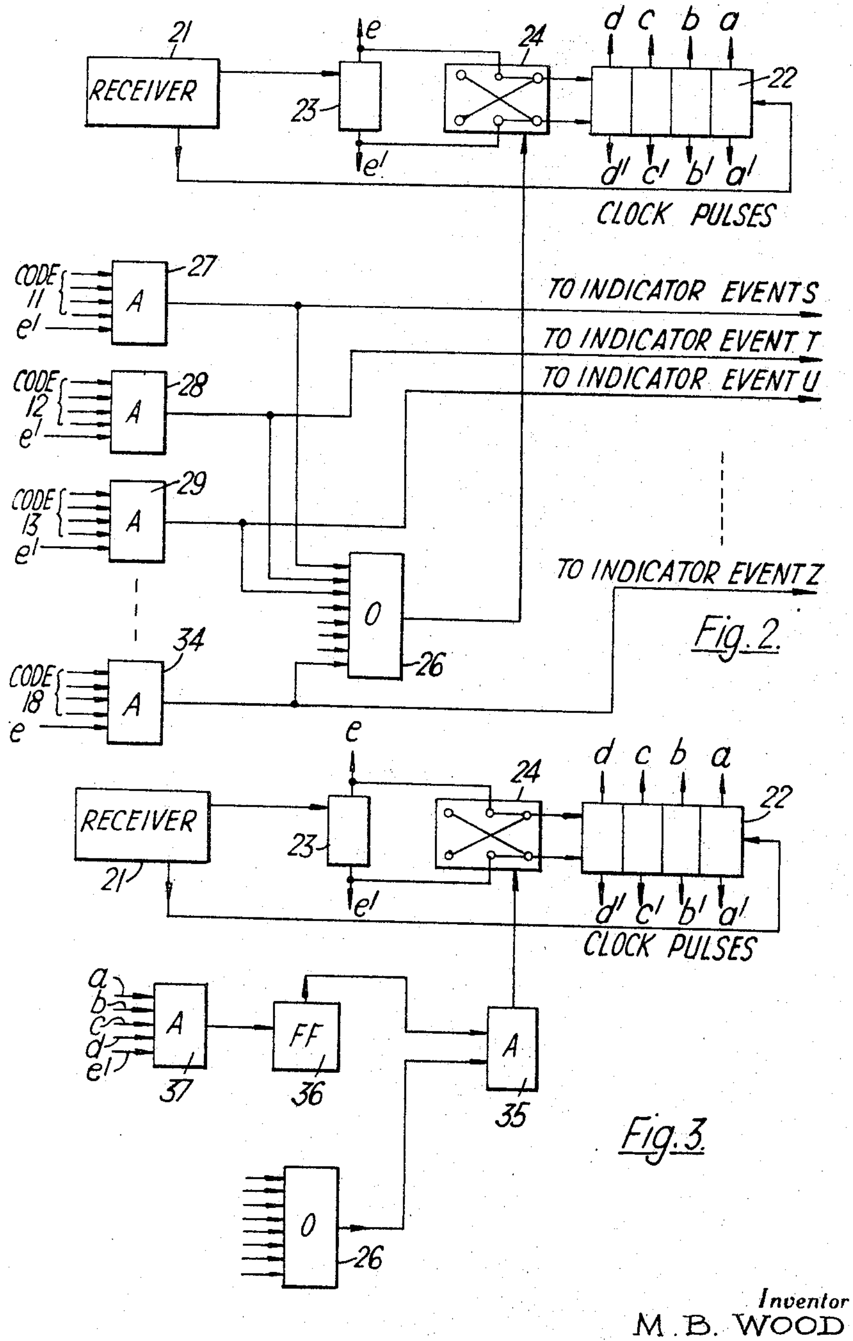
FIGURE 2 is a schematic diagram of equipment located at a receiving station.
Figure 4:
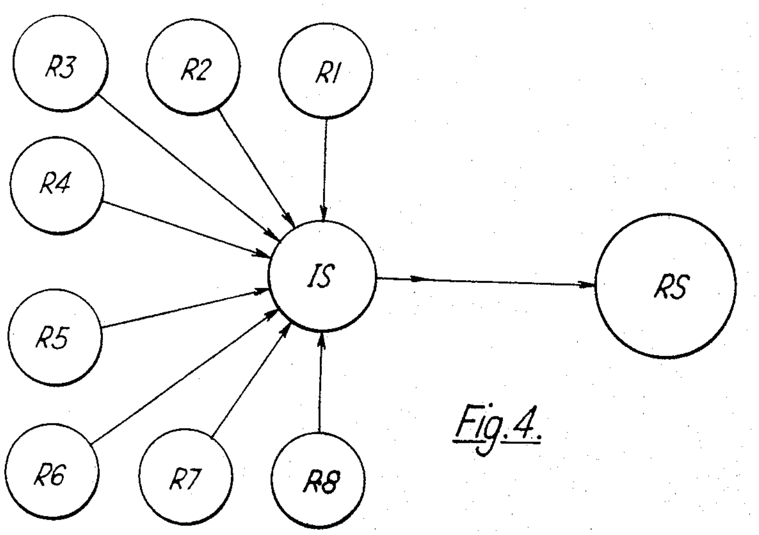
Figure 5:
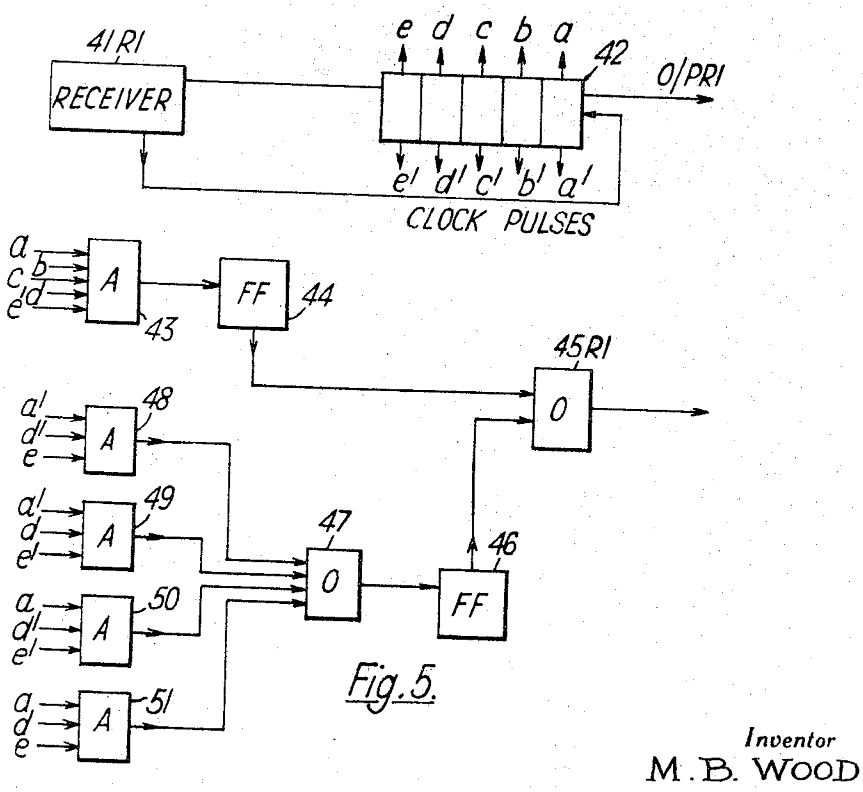
Figure 6:
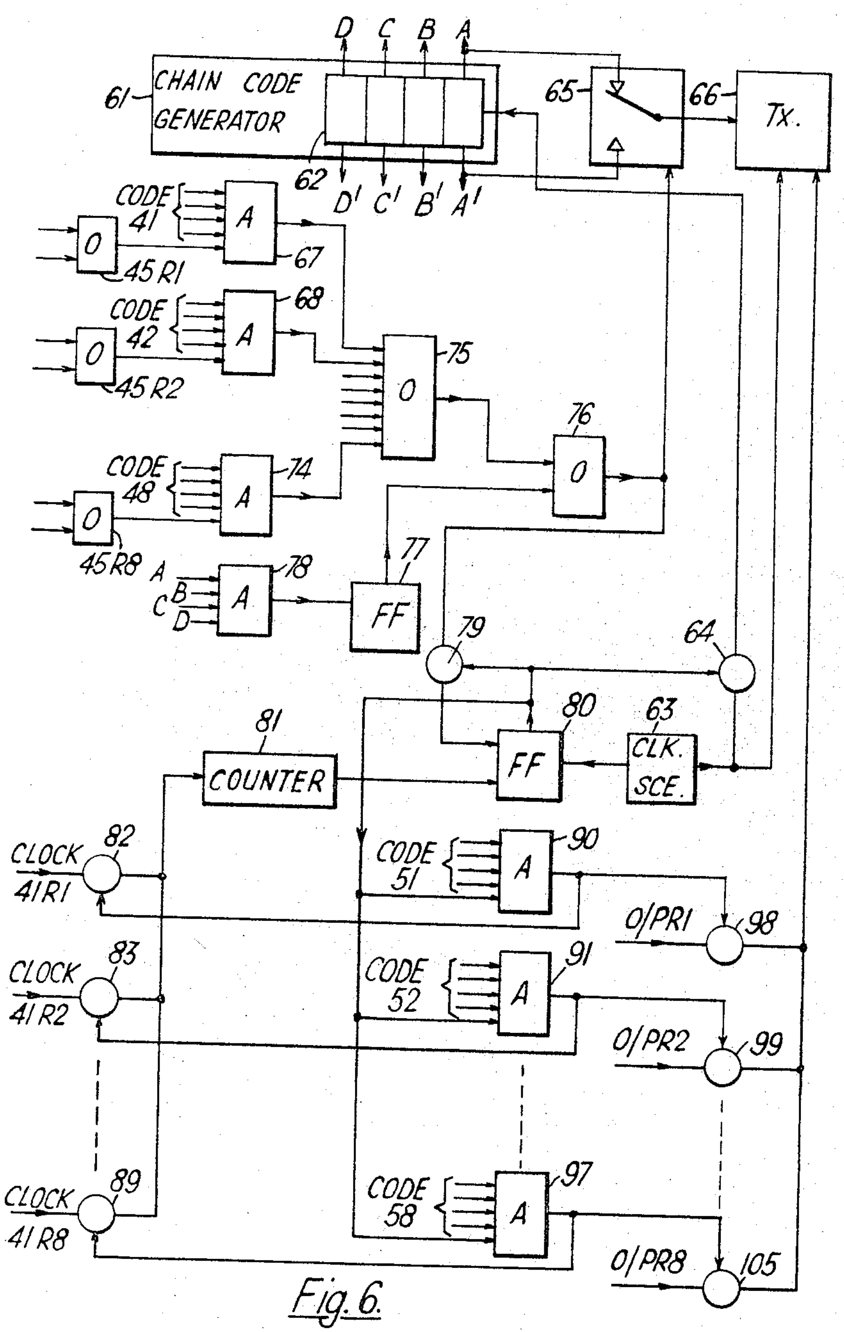
Figure 7:
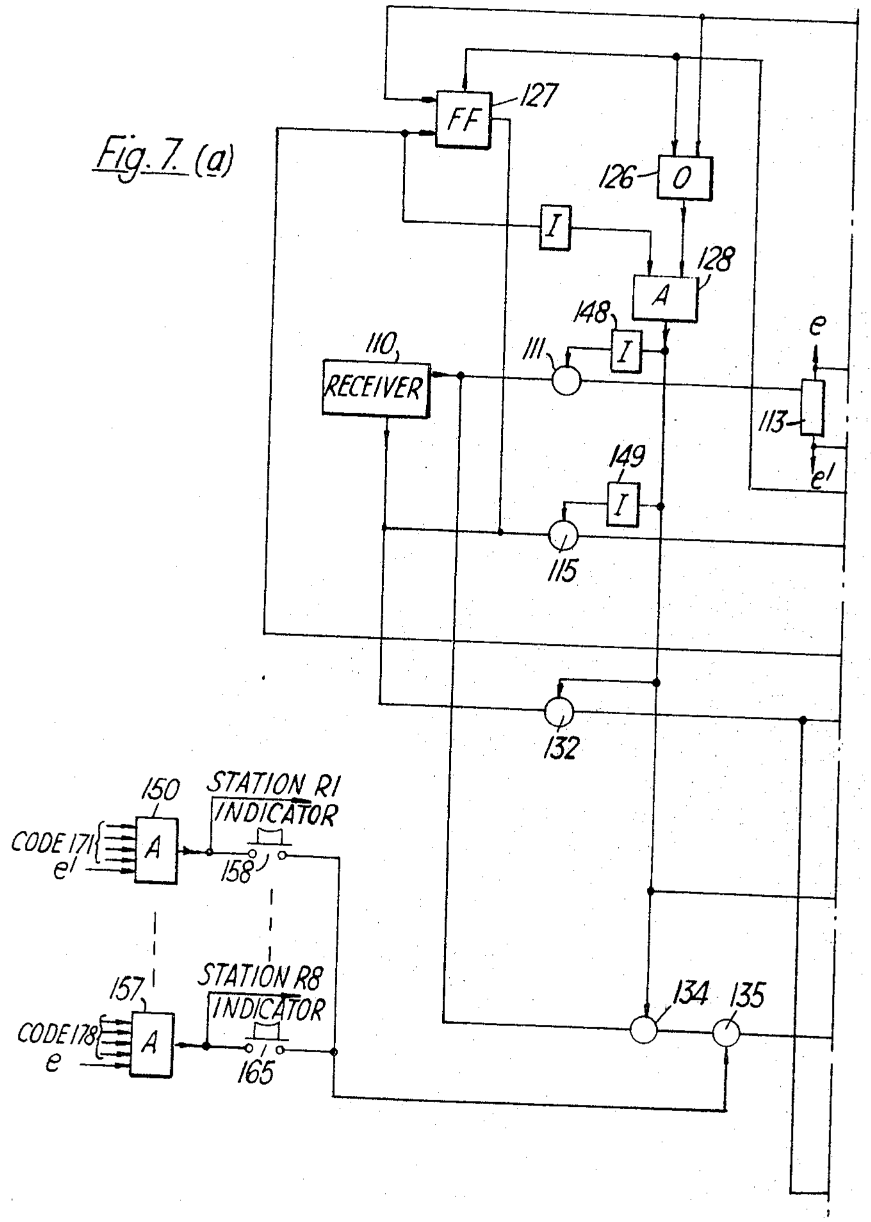
Figure 7:
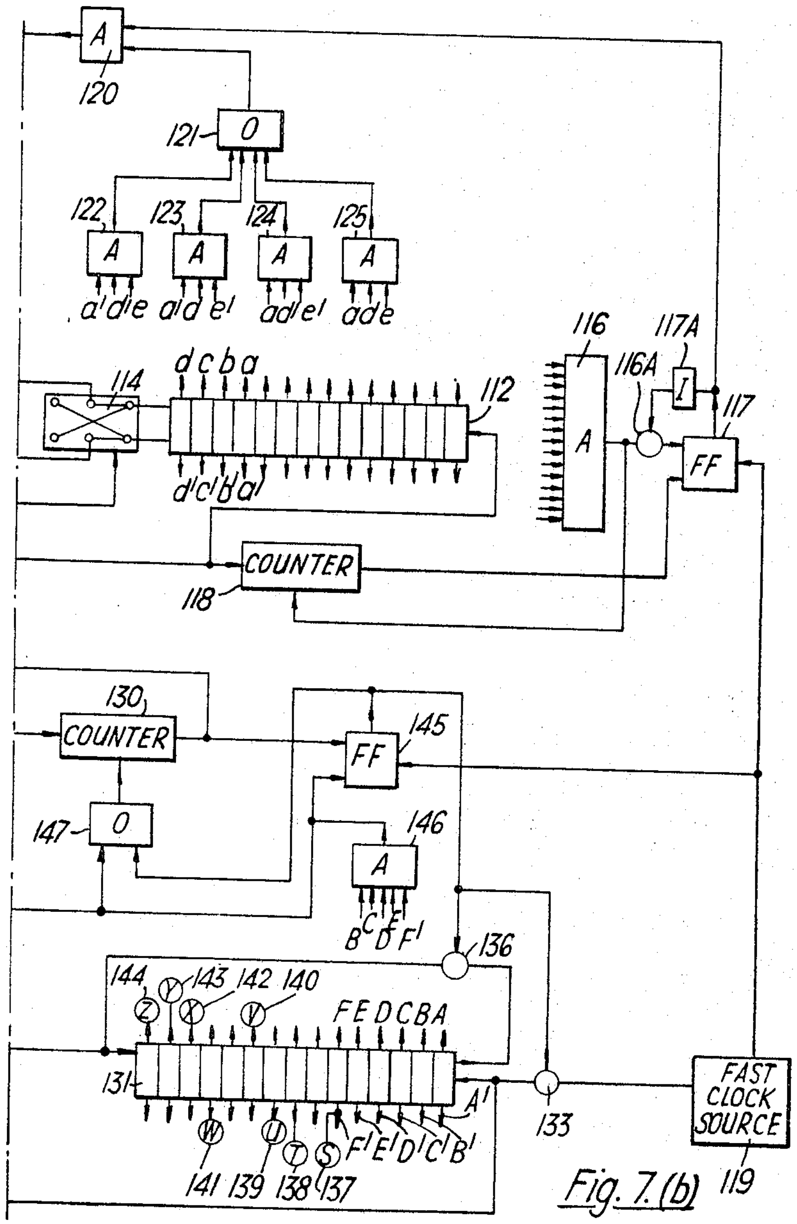

FIGURE 3 is a schematic diagram showing modifications to the equipment shown in FIGURE 2, FIGURE 4 shows a system of eight remote stations linked to a receiving station via a single intermediate station, FIGURES 5 and 6 are schematic diagrams of equipment located at the intermediate station shown in FIGURE 4, and FIGURE 7 is a schematic diagram of equipment located at the receiving station shown in FIGURE 4.

Figure 1:
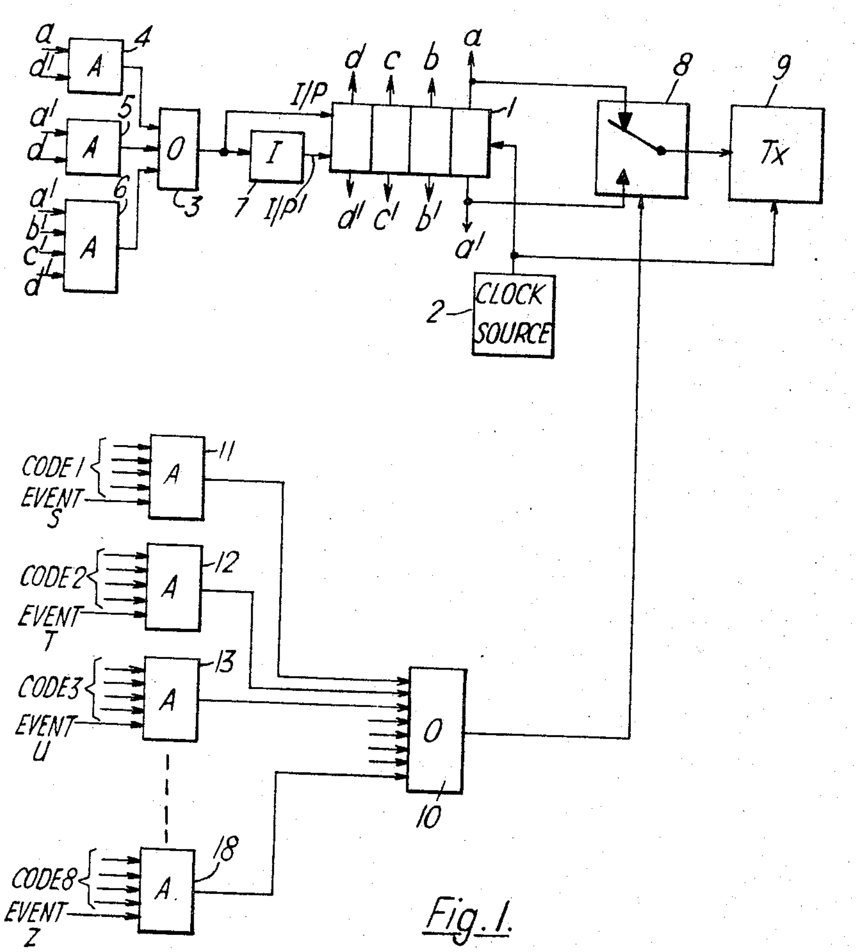
FIGURE 1 is a schematic diagram of equipment located at a remote station.

Referring now to FIGURE 1 of the drawings, in a remote indicating system in accordance with the invention the equipment located at a remote station includes a binary digit chain code generator comprising a four stage shift register 1 driven by a source 2 of clock pulses and having four outputs *a*, *b*, *c*, *d* and four inverse outputs *a'*, *b'*, *c'*, *d'*. The input *I/P* to the shift register 1 is connected to the output of a three input OR gate 3, the inputs of which are connected to the outputs of two double input AND gates 4 and 5, and one four input AND gate 6. The inputs to the AND gate 4 are connected to the shift register outputs *a* and *d'* and the inputs to the AND gate 5 are connected to the shift register outputs *a'* and *d*. The four inputs to the AND gate 6 are connected to the shift register outputs *a'*, *b'*, *c'* and *d'*. The output from the OR gate 3 is also inverted by an inverter 7 and applied to the inverse input *I/P'* to the shift register 1.

The outputs *a* and *a'* of the shift register 1 are connected to a changeover switch 8 (shown as a mechanical switch but which is in fact an electronic switch) the output of which is connected to a transmitter 9. The control for operating the changeover switch 8 is derived from the output of an eight input OR gate 10, the inputs of which are connected to the outputs of eight five input AND gates 11 . . . 18, only four of which are shown. Each of the AND gates 11 . . . 18 has four of its inputs connected to an individual code, to be described later, of the outputs of the shift register 1 and the fifth input connected to a line on which a signal is caused upon the occurrence of one of eight possible events S, T, U . . . Z. Each of these events may be any event which can be arranged to cause an input to an associated AND gate such as the opening or closing of a circuit breaker or the attainment of a critical pressure or temperature.

In operation the digits contained in the shift register 1 are shifted from left to right, the output digit *a* or *a'*, according to the position of the switch 8, being applied to the transmitter 9 at each shift. The AND gates 4 and 5 act as a not equivalence gate such that when the outputs *a* and *d* are not equivalent a new input digit "1" is applied to the shift register input *I/P* and if the outputs *a* and *d* are equivalent a new input digit "0" is applied to the input *I/P*. The AND gate 6 ensures that when the device is switched on and all the outputs *a*, *b*, *c*, *d* are zero, i.e. all the outputs *a'*, *b'*, *c'*, *d'* are ones, a new digit "1" is inserted into the shift register 1. For example, where the four digits contained by the shift register 1 are 1111, i.e. *a* and *d* are equivalent, the next shift pulse from the clock source 2 will cause this to change to 1110, a "1" being passed to the transmitter 9 assuming that the switch 8 is in the position shown. The outputs *a* and *d* are now not equivalent and since the output *d* is now a "0," i.e, the inverse output *d'* is a "1," there will be an output from the AND gate 4 and at the next shift pulse the digits contained in the shift register will be changed to 1101, a "1" again being passed to the transmitter 9. In this manner the following binary digit chain code is generated:

| | | | | | | | | | | | | | | | |
|---|---|---|---|---|---|---|---|---|---|---|---|---|---|---|---|
| Digit No. | 1 | 2 | 3 | 4 | 5 | 6 | 7 | 8 | 9 | 10 | 11 | 12 | 13 | 14 | 15 |
| Chain Code | 1 | 1 | 1 | 1 | 0 | 1 | 0 | 1 | 1 | 0 | 0 | 1 | 0 | 0 | 0 |

After this fifteen digit cycle the code repeats and in the absence of the operation of the switch 8 this is the cyclic code which is transmitted by the transmitter 9.

In this code any pattern of four succeeding digits is unique and any digit may therefore be recognised either by the four preceding digits in the code or by the digit itself plus the next three succeeding digits. Thus digit number six, a "1," is always preceded by the four digits 1110 and therefore, when receiving the code the four digits 1110, which only occur once in the normal code, should be followed by a "1." Similarly, the sixth digit plus the next three succeeding digits makes the unique pattern 1011 and when this pattern is held in the shift register 1 the next digit to be transmitted is always the sixth digit.

In the present invention each of the eight events S . . . 6 is associated with a particular one of the digits in the chain code and the occurrence of the event is arranged to cause the associated digit to be inverted before transmission. This is achieved by means of the AND gates 11 . . . 18. The event S, for example, is associated with digit number six which, as described above, is uniquely identified when the pattern 1011 is held in the shift register 1. The shift register outputs *a*, *b'*, *c* and *d* are therefore all ones and these outputs are connected to four of the five inputs of the AND gate 11, the event S being signalled on the fifth input. In the absence of a signal indicating the occurrence of the event S there will be no output from the AND gate 11 and the sixth digit will be transmitted as a "1" in the normal code. If, however, there is a signal indicating the occurrence of event S there will be an output from the AND gate 11 when the digits 1011 are held in the shift register and this output is applied through the OR gate 10 to change over the switch 8, and at the next shift pulse the sixth digit is therefore inverted before transmission. After this shift pulse the output from the AND gate 11 ceases due to the change in the contents of the shift register 1 and the switch 8 reverts to the position shown unless there is an output from another of the AND gates 12 . . . 18.

The code *a*, *b'*, *c*, *d* to which four of the inputs of the AND gate 11 are connected is the individual code, CODE 1, referred to earlier, and each of the AND gates 12 . . . 18 is similarly connected to an individual code. For example, event 6 is associated with digit number 15 and the individual code to which four of the inputs of the AND gate 18 are connected is *a'*, *b*, *c*, *d*, which are all ones when the recognition pattern 0111 for the fifteenth digit is held in the shift register 1.

At any one time there can only be an output from one of the AND gates 11 . . . 18 and therefore in one complete cycle of the chain code the occurrence of all eight events may be signalled without any risk of confusion. Also, the occurrence of an event will be signalled once per cycle of the chain code during the time for which the occurrence of the event persists.

Referring now to FIGURE 2 of the drawings, the equipment located at a receiving station includes a receiver 21, the output of which is connected to the input of a five stage shift register 22, the fifth stage 23 of which is separated from the fourth stage by a reversing switch 24 (shown as a mechanical switch but which is in fact an electronic switch). The shift register 22 is driven by clock pulses derived from the transmitted code and has five outputs *a*, *b*, *c*, *d*, *e* and five inverse outputs *a'*, *b'*, *c'*, *d'*, *e'*. The control for operating the reversing switch 24 is derived from the output of an eight input OR gate 26, the inputs of which are connected to the outputs of eight five input AND gates 27 . . . 34, only four of which are shown. The outputs of the AND gates 27 . . . 34 are also connected to indicators (not shown) for indicating the occurrence of events S . . . Z. Each of the AND gates 27 . . . 34 has four of its inputs connected to an individual code of the first four stages of the shift register 22 and the fifth input connected to one of the outputs *e* or *e'* of the fifth stage 23 of the shift register.

In operation to detect modifications of the chain code received at the receiving station it is necessary to ensure that only the correct code is applied to the first four stages of the shift register 22 and therefore it is necessary to correct any inverted digits before they are applied to this part of the register. This is achieved by the AND gates 27 . . . 34 and the reversing switch 24. Consider again the event S associated with the sixth digit, a "1." The four preceding digits in the chain code are 1110 and when the sixth digit is held in the fifth stage 23 of the shift register the digits 1110 are then held in the first four stages of the shift register. Four of the five inputs of the AND gate 27 are connected to the outputs *a*, *b*, *c*, *d'* which are all ones when the sixth digit is held in the fifth stage 23 of the shift register and the fifth input is connected to the output *e'*. If the event S has not occurred at the remote station the sixth digit transmitted is a "1," and therefore when this digit is held in the fifth stage 23 of the shift register at the receiving station the output *e'* will be a "0" and there will be no output from the AND gate 27. At the next clock pulse the reversing switch 23 will be in the position shown and the "1" held in the fifth stage 23 will be shifted to the fourth stage of the shift register as correct code. If, however, the event S occurs, the sizth digit is inverted at the remote station and transmitted as a "0." When the sixth digit is now held in the fifth stage 23 of the shift register at the receiving station the first four stages hold the digits 1110 as before but the fifth stage holds a "0" and the output *e'* is therefore a "1." There is therefore an output from the AND gate 27 which causes the operation of the indicator (not shown) to indicate the occurrence of the event S and which also causes an output from the OR gate 26 which in turn causes reversal of the switch 24. At the next clock pulse, therefore, the sixth digit is inverted again before being shifted to the fourth stage of the shift register 22 thereby preserving the correct code in these first four stages.

Detection of the other seven events is carried out in the same manner, four of the five inputs of each of the AND gates 28 . . . 34 similarly being connected to an individual code of the outputs of the first four stages of the shift register 22. It should be noted that whilst a digit is identified by the four preceding digits at the receiving station it is identified by itself plus the three succeeding digits at the remote station and the identifying code for the AND gate 11 of FIGURE 1 is therefore different from the identifying code for the AND gate 27 of FIGURE 2 although both are concerned with the occurrence of the event S.

At the receiving station it is desirable when starting up the system to determine some fixed point in the chain code so that subsequent inversions may be readily recognised. This may be achieved by ensuring that the transmitter at the remote station always transmits a known part of the chain code without any inversion of the digits, this part of the chain code being used as a start pattern in a manner to be described later.

The chain code of the present example is repeated here for convenience:

111101011001000

In this example the first five digits, which are underlined, have been chosen as the start pattern. It is necessary that these digits should not be repeated in the code, and whilst they would not be repeated in the normal code they may be generated by the inversion of one or more of the remaining digits due to the occurrence of one or more events at the remote station. For example, if the seventh digit were inverted or if the tenth atnd eleventh digits were inverted, the start pattern would be generated. This is prevented by banning the seventh and eleventh digits, also underlined above, from being inverted. Of the fifteen digits in the code, therefore, five are banned from inversion to form the start pattern and two are banned from inversion to prevent a repeat of the start pattern. This leaves eight digits which may be inverted as the result of the occurrence of the eight events S . . . Z as described above.

Referring now to FIGURE 3 of the drawings there is shown modifications of the equipment shown in FIGURE 2 by means of which the receiver is able to recognise the start pattern referred to above. The control for operating the reversing switch 24 is now derived from the output of a double input AND gate 35 one input of which is connected to the output of the OR gate 26. The other input of the AND gate 35 is connected to the output of a monostable flip flop 36 triggered by the output of a five input AND gate 37, the inputs of which are connected to the shift register outputs *a*, *b*, *c*, *d* and *e'*.

In operation, when starting up the received digits are fed into the shift register 22 in the normal manner. The operation of the reversing switch 24, however, is prevented until such time as the shift register 22 holds the start pattern 11110. At this time the outputs *a*, *b*, *c*, *d* and *e'* are all ones and there is a resultant output from the AND gate 37 which triggers the monostable flip flop 36. Once triggered the flip flop 36 remains set for a period slightly longer than the time taken to transmit one complete cycle of fifteen digits. For the remainder of the cycle, therefore, the operation of the system is as described above with reference to FIGURE 2, the reversing switch 24 being operated by outputs from the OR gate 26 which are now able to pass through the AND gate 35 due to the continuous signal from the flip flop 36. At the end of the cycle the start pattern 11110 is again held in the shift register 22 and the flip flop 36 will be prevented from reverting to its reset condition due to a further output from the AND gate 37.

If for any reason the start pattern is not held in the shift register 22 due, for example, to a fault in the equipment at the remote station or a breakdown in the transmission system, the flip flop 36 will revert to its reset condition and the resultant change in output may be used to actuate a suitable alarm.

In some system it is necessary to indicate at a receiving station the occurrence of one or more events at any one of several remote stations. In an electrical distribution system, for example, it is necessary for a central receiving station or report centre to be informed of the occurrence of one or more events at any one of several unattended sub-stations. This may be achieved by providing a separate transmission link between each of the remote stations and the receiving station, but if the receiving station is a long distance from the remote stations the provision of several transmission links is very expensive.

FIGURE 4 shows a system in which eight remote stations R1 . . . R8, each provided with equipment of the kind described with reference to FIGURE 1, are connected to an intermediate station IS which in turn is connected over a single transmission link to a receiving station RS. The information that an event has occurred at a remote station is contained in any block of fifteen successive digits transmitted from the remote station. Information could therefore be transmitted from the intermediate station IS to the receiving station RS by transmitting a block of fifteen successive digits from each remote station in turn. However, it is desirable that the occurrence of an event at one of the remote stations should be indicated at the receiving station as soon as possible and in the system about to be described it is arranged that a single digit transmitted from the intermediate station to the receiving station will indicate that no event has occurred at a particular remote station and only if an event has occurred at a remote station will a block of fifteen successive digits be transmitted from that station to the receiving station.

Referring now to FIGURE 5 there is shown part of the equipment located at the intermediate station IS (FIGURE 4) and this part of the equipment is repeated for each of the remote stations R1 . . . R8. The equipment shown is for receiving information from the remote station R1 and includes a receiver 41R1, the output of which is connected to the input of a five stage shift register 42. The shift register 42 is driven by clock pulses derived from the receiver 41R1 and has five outputs *a*, *b*, *c*, *d*, *e* and five inverse outputs *a'*, *b'*, *c'*, *d'*, *e'*, information being shifted out of the register on the output line O/PR1.

A five input AND gate 43 has its five inputs connected to the shift register outputs *a*, *b*, *c*, *d*, *e'* to recognise the start pattern 11110, as described above. The output of the AND gate 43 is applied to the input of a monostable flip flop 44, the output of which is applied to one input of a double input OR gate 45R1. The other input of the OR gate 45R1 is connected to the output of a monostable flip flop 46, the input to which is connected to the output of a four input OR gate 47. The inputs to OR gate 47 are connected to four three input AND gates 48, 49, 50 and 51, the inputs to which are connected to the shift register outputs *a'*, *d'*, *e*, *a'*, *d*, *e'*; *a*, *d'*, *e'*; and *a*, *d*, *e* respectively.

In operation the code received from the remote station R1 is applied to the shift register 42 and shifted through it with no change. When the start pattern 11110 is held in the shift register 42 there is an output from the AND gate 43 which causes the monostable flip flop 44 to change to its set condition in which there is no input applied to the OR gate 45R1. The flip flop 44 is such that it remains in the set condition for a period slightly longer than the time taken to transmit 15 digits. At the end of this time there should be another output from the AND gate 43 so that during satisfactory operation there is no input to the OR gate 45R1 from the flip flop 44. If for any reason the start pattern is not received, however, the flip flop 44 will return to its reset condition and there will be an input applied to the OR gate 45R1.

The AND gates 48 . . . 51 are used to recognize when at least one event has occurred at the remote station R1. The normal code is generated at the remote station R1 by comparing the first and last of four digits and if they are the same inserting a "0" and if they are not the same inserting a "1." The received digits held in the shift register 42 may therefore be checked to see whether an event has occurred by comparing the digits held in the first and fourth stages and checking the fifth digit to see whether it follows the pattern. For example, if the digits *a* and *d* are both a "0" the digit *e* should also be a "0" since *a* and *d* are equivalent. If, however, the digit in the fifth stage has been inverted as the result of an occurrence of an event the output *e* will be a "1." Consequently the shift register outputs *a'*, *d'*, *e* will all be ones and there will be an output from the AND gate 48. Similarly, if output *a* is a "0" and output *d* is a "1," output *e* should be a "1." If, however, the output *e* is a 0, i.e., the outputs *a'*, *d'*, *e'* are all ones, there will be an output from the AND gate 49. In this manner the occurrence of the first event in each cycle is detected, but not which of the eight possible events it is.

Any output from the OR gate 47 causes the monostable flip flop 46 to change to its set condition in which an input is applied to the OR gate 45R1. The flip flop 46, like the flip flop 44, remains in the set condition for a period slightly longer than the time taken to transmit fifteen digits.

An output from the OR gate 45R1 is therefore caused either by no output from AND gate 43 indicating that faulty code or no code has been received from the remote station R1, or by an output from one of the AND gates 48 . . . 51 indicating that an event has occurred at the remote station R1.

As stated above, the equipment shown in FIGURE 5 is repeated for each of the eight remote stations R1 . . . R8 and there are therefore eight output leads O/PR1 . . . O/PR8 from eight shift registers and also eight OR gates 45R1 . . . 45R8.

Referring now to FIGURE 6, there is shown the remainder of the equipment located at the intermediate station IS. The equipment includes a chain code generator 61 which is the same as the chain code generator described with reference to FIGURE 1 and which generates the same chain code. The chain code generator 61 includes a four stage shift register 62 driven by clock pulses derived from a clock source 63 via a gate 64. The shift register has four outputs A, B, C, D and four inverse outputs A', B', C', D'. The output from the chain code generator is applied via a changeover switch 65 to a transmitter 66.

Eight five input AND gates 67 . . . 74, of which only three are shown, are provided and each has four inputs connected to an inividual code, CODE 41 . . . CODE 48, of the outputs of the shift register 62, the fifth input being connected to the output of one of the OR gates 45R1 . . . 45R8 of FIGURE 5. The outputs of the eight AND gates 67 . . . 74 are connected to the inputs of an eight input OR gate 75, the output of which is connected to one input of a double input AND gate 76. The other input to the AND gate 76 is connected to the output of a scale of two counter, shown as a flip flop 77, the input to which is connected to the output of a four input AND gate 78. The inputs to the AND gate 78 are connected to the outputs A, B, C, D, of the shift register 62. The output of the AND gate 76 is applied to control the position of the changeover switch 65.

The output of the AND gate 76 is also applied via a gate 79 to the set input of a clock controlled bi-stable flip flop 80, the reset input of which is connected to the output of a fifteen bit counter 81. The input to the counter 81 is derived from any one of eight gates 82 . . . 89 to which are applied clock pulses from the eight receivers 41R1 . . . 41R8 of FIGURE 5. The output of the bi-stable flip flop 80 is applied to the gate 64 to control the supply of clock pulses to the shift register 62 and is also applied to the gate 79. The output of the bi-stable flip flop 80 is further also applied to one input of each of eight five input AND gates 90 . . . 97, the remaining inputs of which are connected to individual codes, CODE 51 . . . CODE 58, of the outputs of the shift register 62. The outputs of the AND gates 90 . . . 97 are applied to control the gates 82 . . . 89 and are also applied to control eight further gates 98 . . . 105 by means of which the output leads O/PR1 . . . O/PR8 of FIGURE 5 are connected to the transmitter 66.

In operation the chain code generator 61 generates the chain code in the same manner as described with reference to FIGURE 1. When the digits 1111 are held in the shift register 62 for the first time there is an output from AND gate 78 which causes the scale of two counter flip flops 77 to adopt its reset condition in which there is no input to AND gate 76. Since the pattern 1111 does not occur again for a full cycle of the chain code the condition of counter flip flop 77 will not change for a full cycle of the chain code and changeover switch 65 will therefore remain in the position shown so that a complete cycle of unmodified code will be transmitted by the transmitter 66. When the next cycle of the chain code starts the digits 1111 are again held in the shift register 62 and there will be a further output from the AND gate 78. The counter flip flop 77 will therefore change to its set condition in which an input is applied to the AND gate 76.

Each of the OR gates 45R1 . . . 45R8 is associated with a particular digit in the chain code and an output from one of these OR gates is arranged to cause the associated digit to be inverted before transmission in the same manner as the occurrence of an event at one of the remote stations causes the inversion of its associated digit before transmission from that station. Thus the OR gate 45R1 is associated with the sixth digit and the four inputs of the AND gate 67 are connected to the shift register outputs A, B', C, D which are all ones when the digits 1011 are held in the shift register 62, i.e., when the sixth digit is the next digit to be transmitted.

The code A, B', C, D is the individual code, CODE 41, of the outputs of the shift register 62 referred to earlier. If there is no output from the OR gate 45R1, indicating that all is correct at the remote station R1, there will be no output from the AND gate 67 when the digits 1011 are held in the shift register 62. The changeover switch 65 will therefore remain in the position shown and at the next clock pulse the sixth digit will be transmitted as a "1" in the correct code, this transmission of a single correct digit indicating that all is correct at the remote station R1.

If, however, there is an output from the OR gate 45R1 indicating that something is wrong with the code being received from the remote station R1 there will be an output from the AND gate 67 when the digits 1011 are held in the shift register 62. This output is applied via OR gate 75 and AND gate 76 to change the position of switch 65. The output from the AND gate 76 is also applied to the set input of the clock controlled bi-stable flip flop 80 so that at the next clock pulse from clock source 63 the sixth digit is transmitted inverted and flip flop 80 is changed to its set condition. The resultant output from flip flop 80 closes the gate 64 and prevents the application of further clock pulses to the shift register 62 which is therefore stopped whilst holding the digits 0110. The output from flip flop 80 also closes gate 79 thereby preventing a further set input from being applied to the flip flop 80 until it has been reset. The output from flip flop 80 is also applied to one input of each of the AND gates 90 . . . 97 and the other four inputs of the AND gate 90 are connected to the shift register outputs A', B, C, D' which is the individual code, CODE 51, referred to earlier. These outputs are all ones whilst the shift register 62 is stopped holding the digits 0110 and there is therefore an output from the AND gate 90. This output opens the gate 82 permitting clock pulses derived from the receiver 41R1 to be applied to the counter 81 and also opens the gate 98 permitting digits on the output line O/PR1 (which are digits received from the remote station R1) to be applied to the transmitter 66 in which they are synchronised with clock pulses from the clock source 63 and transmitted. Meanwhile clock pulses from the receiver 41R1 are applied to the counter 81 and at the fifteenth pulse there is an output from the counter 81 which is applied to the reset input of the flip flop 80. At the next clock pulse from the clock source 63 the flip flop 80 is changed to its reset condition thereby opening the gates 64 and 79 and closing the gates 82 and 98. At this time fifteen digits, i.e. one complete cycle of the chain code, from the remote station R1 have been transmitted.

At the next clock pulse from the clock source 63 the next digit from the chain code generator 61 will be transmitted, i.e. the seventh digit in the cycle. This digit is associated with the OR gate 45R2 and if there is no output from this gate the switch 65 will have reverted to the position shown and the digit will be transmitted as correct code. If, however, there is an output from the OR gate 45R2 there will be an output from the AND gate 68. The recognition pattern for the seventh digit is 0110 and the individual code, CODE 42, of the shift register outputs to which four inputs of the AND gate 68 are connected is A′, B, C, D′. These digits were the digits held in the shift register 62 during the transmission of the previous fifteen digits from the remote station R1. The AND gate 68 will therefore have been giving an output during the transmission of these digits but the resultant output from the AND gate 76 will have been prevented from being applied to the set input of the flip flop 80 due to the gate 79 being closed. When the flip flop 80 is reset at the end of the fifteen digit count by the counter 81 the gate 79 will be opened and the output from the AND gate 76 will be applied to the set input. The switch 65 will also be held in the opposite position to that shown and at the next clock pulse, therefore, the seventh digit will be transmitted as an inverted digit and the flip flop 80 will be again changed to its set condition. The gates 79 and 64 will again be closed and the shift register 62 will be stopped whilst holding the digits 1100. The individual code, CODE 52, of the shift register outputs to which four of the inputs of the AND gate 91 are connected is A, B, C′, D′ and there is therefore an output from this gate which opens the gates 83 and 99 whereby fifteen digits from the remote station R2 are transmitted by the transmitter 66.

In this manner the remainder of the cycle of the chain code generator 61 is completed, the appropriate digit being inverted, the chain code generator 61 being stopped and fifteen digits from the appropriate remote station being transmitted each time there is an output on one of the remaining OR gates 45R3 . . . 45R8.

At the end of the cycle the digits 1111 will again be held by the shift register 62 and there will be a further output from the AND gate 78 which changes the flip flop 77 to its reset condition thereby blocking the AND gate 76. Another complete cycle of unmodified code will therefore be transmitted before there is a further output from the AND gate 78 to change the flip flop 77 to its set condition and unblock the AND gate 76.

The code transmitted from the intermediate station therefore consist of alternate cycles of unmodified code and cycles which may be modified to contain one or more inverted digits each of which is followed by fifteen digits from the appropriate remote station. As will be seen later, the unmodified cycle is used as the start pattern at the receiver. It is desirable to use a complete cycle as a start pattern since it would be extremely difficult to choose a shorter start pattern which could be guaranteed not to be repeated in the cycles of modified code transmitted from the remote stations.

Referring now to FIGURE 7 of the drawings there is shown the equipment located at the receiving station RS (FIGURE 4). This equipment includes a receiver 110, the output of which is applied via a gate 111, to the input of a fifteen stage shift register 112, the fifteenth stage 113 of which is separated from the fourteenth stage by a reversing switch 114 (shown as a mechanical switch but which is in fact an electronic switch). The shift register 112, driven by clock pulses derived from the receiver 110 via a gate 115, has fifteen outputs, five of which are indicated as *a, b, c, d, e,* and fifteen inverse outputs, five of which are indicated as *a′, b′, c′, d′, e′*. A fifteen input AND gate 116 has its inputs connected to the outputs of the shift register 112 to detect when a complete cycle of unmodified code is held in the shift register 112. The output of the AND gate 116 is applied via a gate 116A to the set input of a flip flop 117, the reset input of which is connected to the output of a fifteen bit counter 118 for counting clock pulses passing through the gate 115, the counter being reset to zero by the output from the AND gate 116. The output of the flip-flop 117, which is driven by fast clock pulses from a fast clock source 119, is applied via an inverter stage 117A to control the gate 116A, and is also applied to one input of a double input AND gate 120, the other input of which is connected to the output of a four input OR gate 121. The inputs of the OR gate 121 are connected to the outputs of four three input AND gates 122, 123, 124 and 125 having their inputs connected to the shift register outputs *a′, d′, e*; *a′, d, e′*; *a, d′, e′*; and *a, d, e* respectively. The output of the AND gate 120 is applied to one input of a double input OR gate 126 and also to the set input of a flip flop 127 driven by clock pulses derived from the receiver 110. The output of the flip flop 127 is applied to the other input of the OR gate 126 and also to control the reversing switch 114. The output of the OR gate 126 is applied to one input of a double input AND gate 128 the other input of which is connected via an inverter 129 to the output of a further fifteen bit counter 130, the output of which is also connected to the reset input of the flip flop 127.

A further fifteen stage shift register 131 is adapted to be given either by clock pulses from the receiver 110 via a gate 132 or by fast clock pulses from the fast clock source 119 via a gate 133. The output of the receiver 110 is connected via two gates 134 and 135 to the input of the shift register 131 which has fifteen outputs, six of which are shown as A, B, C, D, E, F, and fifteen inverse outputs, six of which are shown as A′, B′, C′, D′, E′, F′. The output of the shift register 131 is connected to the input via a gate 136, and indicators 137 . . . 144 for indicating the occurrence of events S . . . Z respectively are connected to the outputs or the inverse outputs of the sixth, eighth, ninth, tenth, twelfth, thirteenth, fourteenth and fifteenth stages as shown in the drawing.

The conrol for the gates 133 and 136 is derived from the output of a flip-flop 145, the set input of which is connected to the output of the counter 130 and the reset input of which is connected to the output of a five input AND gae 146 having its inputs connected to the outputs B, C, D, E, F′ of the shift register 131. The output of the flip flop 145 is also connected to one input of a double input OR gate 147, the output of which is applied to the reset input of the counter 130. The other input to the OR gate 147 is connected to the output of the AND gate 128, which output is also applied to control the gates 111 and 115 via inverter stages 148 and 149 respectively, and to control the gates 132 and 134 directly. The control for the gate 135 is derived from the output of one or other of eight five input AND gates 150 . . . 157 via the appropriate one of eight manually operated switches 158 . . . 165. Each of the AND gates 150 . . . 157 has four of its inputs connected to an individual code, CODE 171 . . . CODE 178, of the outputs *a, b, c, d, a′, b′, c′, d′*, of the shift register 112 and its other input connected to the output *e* or *e′*. The outputs of the AND gates 150 . . . 157 are also connected to indicators (not shown) for indicating at which of the remote stations R1 . . . R8 there is an event to report.

In operation the initial conditions at the receiver are that all flip flops and counters are in their reset condition and the reversing switch 114 is in the position shown. There is no output from the AND gate 128 and the gates 111 and 115 are therefore open and the gates 132 and 134 are closed. Code received from the intermediate station IS is therefore applied to the shift register 112 and shifted into this register as received until a complete cycle of unmodified code is held in the register, any output from the counter 118 having no effect since the flip flop 117 is already in its reset condition. When a complete cycle of unmodified code is held in the shift register 112 there is an output from the AND gate 116 which resets the counter 118 and which causes the flip flop 117 to change to its set condition in which one input is applied to the AND gate 120 and in which the gate 116A is closed until the flip flop 117 is reset. Thereafter the received code is applied to the shift register 112 and shifted into the register as received until an inverted digit is held in the last stage 113 of the register. This inverted digit is detected by one of the AND gates 122 . . . 125 in the manner described with reference to FIGURE 5 and the resultant output from the OR gate 121 is applied via the AND gate 120 to one input of the OR gate 126 and to the set input of the flip flop 127. Since there is no output from the counter 130 there is an output from the AND gate 128 which closes the gates 111 and 115, opens the gates 132 and 134 and resets the counter 130 and the flip flop 145. The next fifteen clock pulses and output digits from the receiver 110, which, since they follow an inverted digit, are the fifteen digits from a remote station, are then passed through the gates 132 and 134 respectively, but the gate 135 is closed and the output digits are not applied to the shift register 131. The clock pulses however are applied to the counter 130 which gives an output when the fifteenth clock pulse has been received. This output is applied to the reset input of the flip flop 127 which at this time is in its set condition, the reversing switch 114 therefore being in the opposite position to that shown. The output from the counter 130 is also inverted by the inverter 129 to block the AND gate 128 thereby opening the gates 111 and 115 and closing the gates 132 and 134. At the next clock pulse from the receiver 110 the inverted digit held in the stage 113 of the shift register 112 is again inverted by the change over switch 114 and shifted along the register 112 as correct code, and the flip flop 127 is changed to its reset condition, the resultant output causing the changeover switch 114 to change back to the position shown. If the digit now held in the shift register stage 113 is correct code the gates 111 and 115 remain open and the received code continues to pass into the shift register 112 until another inverted digit is received which again causes the gates 111 and 115 to close and the gates 132 and 134 to open. In this manner the blocks of fifteen digits from the remote stations are sorted from the code generated at the intermediate station.

When fifteen digits of the intermediate station code have been received and shifted into the register 112 there is an output from the counter 118 which causes the flip flop 117 to be reset before the next digit is received. One input to the AND gate 120 is therefore removed and the next fifteen digits, which should be a complete cycle of unmodified code from the intermediate station, are shifted into the register 112. If this code is correct there is a further output from the AND gate 116 which resets the counter 118 and causes the flip flop 117 to change to its set condition thereby unblocking the AND gate 120.

Inverted digits held in the shift register stage 113 are also detected by one of the AND gates 150 . . . 157, the individual codes, CODE 171 . . . CODE 178, being such that these AND gates determine which digit has been inverted and thus at which remote station there is one or more events to report in the same manner as the occurrence of an event was detected as described with reference to FIGURE 2. The outputs from these AND gates 150 . . . 157 cause the operation of remote station indicators to inform a controller at the receiving station that there is an event to report from one or more of the remote stations. To determine which events have occurred at a selected remote station the controller closes the appropriate one of the switches 158 . . . 165, for example the switch 158 to determine which events have occurred at the remote station R1. When the next inverted digit associated with the remote station R1 is held in the shift register stage 113 there is an output from the AND gate 150 which opens the gate 135 via the closed switch 158. The gate 134 is also opened by this inverted digit as described above and the fifteen digits from the remote station R1 are therefore shifted into the shift register 131. When the fifteen digit has been shifted into the register 131 there is an output from the counter 130 which in addition to closing the gates 132 and 134 as described above, causes the flip flop 145 to change to its set condition. The resultant output from the flip flop 145 resets the counter 130 and opens the gates 133 and 136. The digits held in the register 131 are therefore cyclically shifted under the control of the fast clock source 119 until there is an output from the AND gate 146 which occurs when the start pattern 11110 is held in the second to sixth stages of the shift register 113. The output from the AND gate 146 is applied to the reset terminal of the flip flop 145 so that at the next fast clock pulse the flip flop 145 is reset to close the gates 133 and 136 and the digits in the register 131 are shifted one stage so that the start pattern is now held in the first five stages of the register. Any inverted digits held in the register 131 now cause the operation of the appropriate ones of the indicators 137 . . . 144. For example, if the event S has not occurred the sixth stage of the register will hold a "1" and the output F' will be zero. If, however, the event S has occurred the sixth stage of the register will hold a "0" and the output F' will be a "1" which will cause the operation of the indicator 137. The fast clock source 119 is fast enough to ensure that the cycling of the digits held in the shift register 131 is completed before the receipt of the next clock pulse from the receiver 110.

To determine which events have occurred at another remote station the controller has only to close the appropriate one of the switches 158 . . . 165 and fifteen digits from the desired remote station are then inserted into the shift register 131 when an inverted digit associated with the desired remote station is next received.

The equipment described above may be modified in many ways. For example, since one complete cycle of unmodified code is used as the start pattern from the intermediate station each digit in the next cycle of code may be associated with a remote station whereby fifteen remote stations could be linked to the one intermediate station instead of the eight described. Furthermore, the code generated at the intermediate station has been described as the same as the code generated at the remote stations, but a different code could be used. At the receiving station a separate shift register such as the register 131 could be provided for each of the remote stations if it was desired to indicate events occurring at two or more remote stations simultaneously. The binary digit chain code described has been shown to be suitable for reporting the occurrence of up to eight different events. If it is required to report the occurrence of more than eight events a longer chain code may be used in the same manner. A longer chair code may also be generated at the intermediate station if it is desired to link more than fifteen remote stations to the intermediate station. Also, in the system described above the chain code has been modified to indicate the occurrence of an event by inverting one of the digits. The chain code may, however, be modified in other ways. The occurrence of an event could, for example, cause a particular shortened form of the chain code to be transmitted instead of a full cycle, this particular shortened form being detected at the receiving station to indicate which event had occurred.

What I claim is:

1. A method of indicating at a receiving station the occurrence of one or more events at a remote station comprising continuously generating a binary digit chain code at said remote station, modifying said chain code upon the occurrence of a particular event in a manner peculiar to that event, continuously transmitting said chain code or said modified chain code to said receiving station, continuously detecting modifications of said chain code at said receiving station, and indicating the occurrence of said particular event in response to detected modifications of said chain code.

2. A method as claimed in claim 1 in which the step of modifying said chain code upon the occurrence of a particular event includes inversion of a particular digit in each cycle of said chain code.

3. A method as claimed in claim 2 including reserving for use as a recognition pattern at said receiving station a group of digits in each cycle of said chain code.

4. A method as claimed in claim 3 further including banning other digits in each cycle of said chain code from inversion to prevent the false generation of said group of digits.

5. Apparatus for indicating at a receiving station the occurrence of one or more events at a remote station comprising a binary digit chain code generator located at said remote station, means for causing the occurrence of a particular event at the remote station to modify the output of said chain code generator in a manner peculiar to that event, means for continuously transmitting the unmodified or the modified output of said chain code generator to said receiving station, detecting means located at said receiving station for continuously detecting modified outputs of said chain code generator, and means for causing the output of said detecting means to indicate the occurrence of said particular event.

6. Apparatus as claimed in claim 5 in which said means for causing the occurrence of a particular event to modify the output of said chain code generator comprises means for inverting a particular digit in each cycle of the output of said chain code generator upon the occurrence of said particular event.

7. Apparatus as claimed in claim 6 in which a group of digits in each cycle of the output of said chain code generator are reserved for use as a recognition pattern and including means located at said receiving station for detecting said recognition pattern.

8. Apparatus as claimed in claim 7 including means located at said receiving station for indicating when said recognition pattern is not detected during each cycle of the output of said chain code generator.

9. A method of indicating at a receiving station the occurrence of one or more events at any one of a plurality of remote stations comprising continuously generating a like binary digit chain code at each remote station, modifying the chain code generated at any one of said remote stations upon the occurrence of a particular event at that remote station in a manner peculiar to that event, transmitting said chain code or said modified chain code from each remote station to a common intermediate station, transmittting from said intermediate station to said receiving station complete cycles of the modified chain codes received from said remote stations together with an indication of which remote station each modified chain code has been received from, detecting the modified chain codes at said receiving station, and indicating output to indicate the occurrence of said particular event and at which of said remote stations said event has occurred.

10. A method as claimed in claim 9 in which the occurrence of a particular event at any one of said remote stations causes the inversion of a particular digit in each cycle of said chain code generated at that remote station.

11. A method as claimed in claim 9 which further comprises generating an intermediate station binary digit chain code at said intermediate station detecting modified chain codes received at said intermediate station from said remote stations, causing the detection of a modified chain code from a particular remote station to modify said intermediate station chain code in a manner peculiar to that particular remote station, and transmitting from said intermediate station to said receiving station said intermediate station chain code or said modified intermediate station chain code together with a complete cycle of each modified chain code received at said intermediate station from said remote stations.

12. A method as claimed in claim 11 in which the detection of a modified chain code from a particular remote station causes the inversion of a particular digit in each cycle of said intermediate station chain code.

13. Apparatus for indicating at a receiving station the occurrence of one or more events at any one of a plurality of remote stations comprising at each remote station a binary digit chain code generator, each generator generating a like binary digit chain code, means for causing the occurrence of a particular event at any one of said remote stations to modify the chain code generated at that remote station in a manner peculiar to that event, an intermediate station, means for transmitting the unmodified or the modified chain code generated at each remote station to said intermediate station, means for transmitting from said intermediate station to said receiving station complete cycles of the modified chain codes received from said remote stations together with an indication of which remote station each modified chain code has been received from, detecting means located at said receiving station for detecting said modified outputs, and means for causing the output of said detecting means to indicate the occurrence of said particular event and at which of said remote stations said event has occurred.

14. Apparatus as claimed in claim 13 in which said means for causing the occurrence of a particular event at any one of said remote stations to modify the chain code generated at that remote station comprises means for inverting a particular digit in each cycle of said chain code upon the occurrence of said particular event.

15. Apparatus as claimed in claim 14 in which said means for inverting a particular digit comprises for each event to be indicated an AND gate having as inputs an identification pattern of digits immediately succeeding said particular digit and a signal representing the occurrence of said event, and an inverter switch controlled by the output of said AND gate.

16. Apparatus as claimed in claim 13 including a binary digit chain code generator located at said intermediate station for generating an intermediate station chain code, means located at said intermediate station for detecting modified chain codes received from said remote stations, means for causing the detection of a modified chain code from a particular remote station to modify said intermediate station chain code in a manner peculiar to that particular remote station, and means for transmitting from said intermediate station to said receiving station said intermediate station chain code or said modified intermediate station chain code together with a complete cycle of each modified chain code received at said intermediate station from said remote stations.

17. Apparatus as claimed in claim 16 in which said means for causing the detection of a modified chain code from a particular remote station to modify said intermediate station chain code comprises means for inverting a particular digit in each cycle of said intermediate station chain code upon the detection of a modified chain code from a particular remote station.

18. Apparatus as claimed in claim 16 including means for transmitting from said intermediate station to said receiving station alternately a cycle of unmodified intermediate station chain code and a modified cycle of intermediate station chain code together with a complete cycle of each modified chain code received from said remote stations.

19. Apparatus as claimed in claim 16 in which there is located at said receiving station a first shift register adapted to receive the digits of said intermediate station chain code, said first shift register having a number of stages equal to the number of digits in an unmodified cycle of said intermediate station chain code, and a second shift register adapted to receive the digits of the modified chain codes received from said remote stations, said second shift register having a number of stages equal to the number of digits in an unmodified cycle of said chain code generated at each of said remote stations.

20. Apparatus as claimed in claim 19 including an inverter switch connected between the first and second stages of said first shift register, means for detecting an inverted digit in the first stage of said first shift register, and means for operating said inverter switch in response to an output from said means for detecting an inverted digit such that said inverted digit is corrected before entering the second stage of said first shift register.

21. Apparatus as claimed in claim 19 including means for cycling the digits contained in said second shift register until said digits are held in said second shift register in a required position.

References Cited

UNITED STATES PATENTS

| | | | |
|---|---|---|---|
| 2,504,999 | 4/1950 | McWhirter et al. | |
| 3,159,811 | 12/1964 | James et al. | 340—147 X |
| 3,166,734 | 1/1965 | Helfrich | 340—147 |
| 3,175,191 | 3/1965 | Cohn et al. | 340—164 |

NEIL C. READ, *Primary Examiner.*

D. YUSKO, *Assistant Examiner.*

UNITED STATES PATENT OFFICE
CERTIFICATE OF CORRECTION

Patent No. 3,335,404 August 8, 1967

Michael Broadley Wood

It is hereby certified that error appears in the above numbered patent requiring correction and that the said Letters Patent should read as corrected below.

Column 3, lines 32 and 60, for "6", each occurrence, read -- Z --; column 4, line 42, for "sizth" read -- sixth --; column 6, line 6, for "fiftteen" read -- fifteen --; column 10, line 41, for "gae" read -- gate --; column 12, line 1, for "fifteen" read -- fifteenth --; line 53, for "chair" read -- chain --; column 13, lines 54 and 55, strike out "output to indicate".

Signed and sealed this 18th day of June 1968.

(SEAL)
Attest:

Edward M. Fletcher, Jr.
Attesting Officer

EDWARD J. BRENNER
Commissioner of Patents